(No Model.)

W. H. FULLER.
PHOTOGRAPHIC CAMERA.

No. 393,696. Patented Nov. 27, 1888.

Witnesses
Geo. Wadman
M. J. Roach

Inventor:
W. H. Fuller
by his attys
Gifford & Brown

UNITED STATES PATENT OFFICE.

WILLARD H. FULLER, OF PASSAIC, NEW JERSEY, ASSIGNOR TO THE SCOVILL MANUFACTURING COMPANY, OF NEW YORK, N. Y.

PHOTOGRAPHIC CAMERA.

SPECIFICATION forming part of Letters Patent No. 393,696, dated November 27, 1888.

Application filed July 9, 1887. Serial No. 213,814. (No model.)

*To all whom it may concern:*

Be it known that I, WILLARD H. FULLER, of Passaic, in the county of Passaic and State of New Jersey, have invented a certain new and useful Improvement in Photographic Cameras, of which the following is a specification.

My improvement relates more particularly to a camera stand, or, in other words, is involved in those parts of a camera whereby the camera proper is supported.

I will describe a camera embodying my improvement, and then point out its novel features in the claim.

Figure 1:
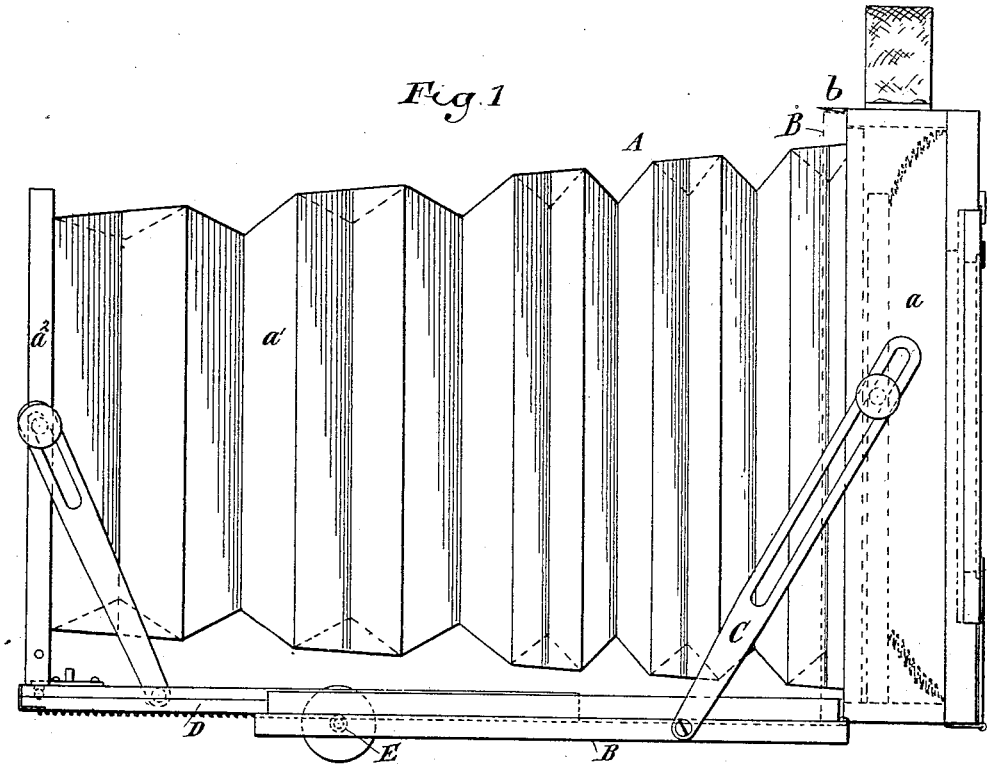
Figure 2:
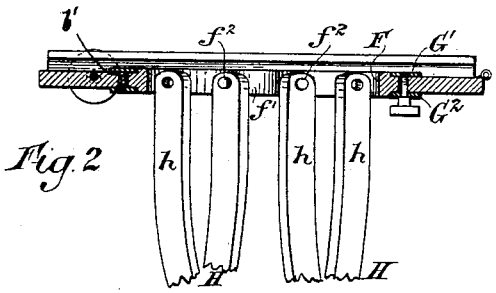
Figure 4:
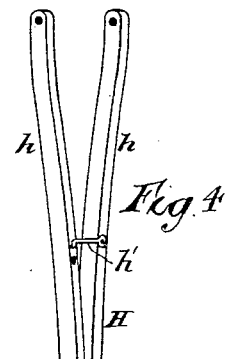
Figure 3:
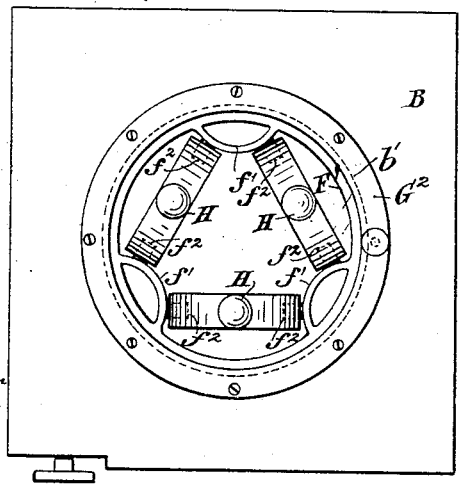

In the accompanying drawings, Figure 1 is a side view of a camera embodying my improvement in condition for use. In this figure I have also shown in dotted outline the condition of the camera when packed for transportation. Fig. 2 is a transverse section of a leaf or base-board forming part of the camera and constituting the part of the camera which is secured to the supporting-stand. In this figure I have also shown two legs of the camera-stand. Fig. 3 is an inverted plan of this leaf or section, and also includes a representation of legs forming the camera-stand. Fig. 4 is a side view of one of the legs of the camera-stand.

Similar letters of reference designate corresponding parts in all the figures.

A designates the camera. It consists of a back piece, $a$, a bellows-like body, $a'$, of ordinary construction, and a front piece, $a^2$, connected to the forward end of the bellows-like body and provided with an ordinary lens-tube. The back piece is provided with a cavity, into which the bellows like body and a front piece may be contracted. It has hinged to the lower edge of its forward side a leaf or base-board, B. This leaf or base-board B may be swung up against the front of the back piece after the bellows-like body and front piece have been contracted into the same, so as to form a cover, and when in this position it may be secured by a spring-hook, $b$, or other means. I have represented the parts arranged as just described in dotted outline in Fig. 1. This leaf or base-board may be lowered into a position at right angles to the camera, as shown in bold outline in Fig. 1. When in this position, it may be secured relatively to the camera proper by means of braces C, consisting of rods pivoted at one end to its sides and extending at the other end adjacent to the sides of the back piece, $a$, of the camera, and longitudinally slotted to receive screws, whereby they may be clamped to the back piece of the camera to secure the leaf or base-board at the desired angle.

The leaf or base-board B is provided with a carriage, D, capable of adjustment lengthwise of it by means of a long pinion, E, provided with a hand-piece and racks affixed to the carriage and engaging with the pinion. The front piece of the camera, when distended for use, is fastened in any desired position to the carriage D, and may afterward be adjusted by means of the pinion. The leaf or base-board B is provided with a central circular opening, $b'$. This opening extends entirely through it and is of considerable size. It is shown as smaller in diameter than a rectangular opening, $d$, with which the carriage D is provided. Within this circular opening $b'$ of the leaf or base-board B a ring, F, is fitted. This ring may be made of brass or any other suitable material. It is transversely of about the thickness of the leaf or base-board B. It is rabbeted at the outer edge on both sides, so as to form a circular tongue, $f$. The leaf or base-board B is provided on opposite sides with ring-shaped plates $G'$ $G^2$, which may be made of brass or other suitable metal. They may be countersunk into the surfaces of the leaf or base-board and secured in place by screws or otherwise. They extend over the opposite sides of the tongue $f$, and thereby secure the ring F in position. The tongue itself, preferably, does not contact with the edge of the circular hole $b'$ in the leaf or base-board; but the shoulders of the ring F, which are formed by its rabbets, contact with the inner edges of the ring-plates $G'$ $G^2$, so that these plates center the ring F, besides preventing it from transverse displacement. The ring F may turn or rotate relatively to the leaf or base-board, or, conversely, the camera, including the leaf or base-board, may be turned relatively to the ring F. The ring F is connected to legs H, forming a stand or tripod for supporting the camera.

It will be seen that at intervals the inner surface of the ring F is provided with bows $f'$, from which extend pin shaped lugs $f^2$. These lugs are so arranged that one extending from each of the bows is in line with one extending from the next adjacent bow. Each pair, which are thus in alignment, forms a pivot, whereby one of the legs H of the stand or tripod is connected to the ring F. The pivotal connection thus formed between the ring F and the legs H affords the usual adjustment of the legs to adapt them to form a suitable support on uneven ground.

The legs H may be made of wood. Each will preferably be made of two resilient pieces of wood, $h$, secured rigidly together at the lower end and there provided with a metal spike. The upper ends will be provided with eyes capable, when said ends are spread apart, of being slipped upon pairs of the lugs $f^2$, which are in alignment. When thus engaged, braces will be secured between the extended upper ends of the two pieces forming the leg. I have shown braces $h'$ pivoted to one piece of each pair, forming a leg and adapted to engage with an eye on the opposite piece. When the legs are to be disengaged, the braces $h'$ will be displaced, so that the pairs of pieces forming the several legs may at their upper ends, as well as at their lower ends, lie close together, and then the three legs, having been detached from the leaf or base-board of the camera, may be tied together in a bundle and the camera closed up into the condition in which it is represented by the aid of the dotted outlines in Fig. 1.

The ring F will work with little friction in the leaf or base-board B of the camera, and as there is an opening entirely through the leaf or base-board within said ring F the lens-tube of the camera may be almost entirely, if not wholly, accommodated within the ring F.

What I claim as my invention, and desire to secure by Letters Patent, is—

In a photographic camera, the combination, with a back, a bellows, and front piece, said bellows and front piece adapted to be inclosed within the back piece by a bodily movement toward said back piece, of a leaf or base-piece hinged to said back piece, so as to fold up against the back piece and close one side of the same and to be extended at an angle to it, said base-piece having an opening through which may extend a lens-tube on the front piece when the base-piece is folded, a ring having a tongue movable in ring-plates secured to the base-piece and having on its surface a series of bows provided with aligned lugs, and a carriage on said base-piece having a lengthwise adjustment and having a rectangular opening, substantially as specified.

WILLARD H. FULLER.

Witnesses:
H. LITTLEJOHN,
JOS. BARTON.